April 11, 1933.  W. MEINDERSMA  1,903,551
FIN PROPELLER
Filed Nov. 25, 1931
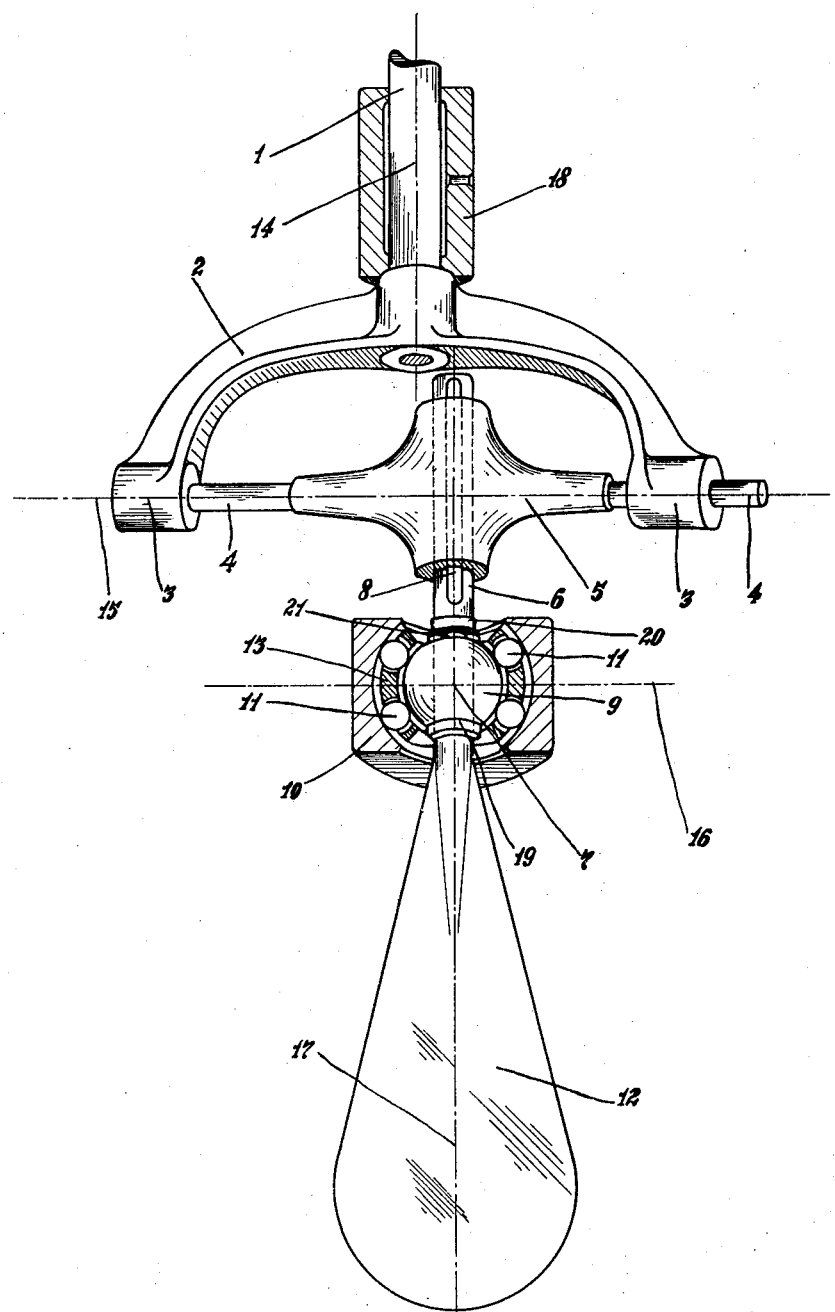

Patented Apr. 11, 1933

1,903,551

UNITED STATES PATENT OFFICE

WIGGER MEINDERSMA, OF WASSENAAR, NETHERLANDS

FIN PROPELLER

Application filed November 25, 1931, Serial No. 577,331, and in the Netherlands December 1, 1930.

The invention relates to mechanism for a driving fin propeller of the kind in which the axis of the propeller describes a conical circuit and the propeller makes half a revolution around the said axis, which motion is obtained by means of rotating guide means, hingedly guiding a member in radial sense.

According to the present invention the said member is axially movably arranged on the propeller arm.

A mechanism is known in which a similar member is rigidly connected to the propeller arm and in which the guiding takes place along a straight line, drawn on a ball surface and not hingedly.

Further mechanism with straight guidings are known, comprising many parts and which are not axially movable along the propeller arm.

By connecting the propeller arm movably to a member which in radial sense is guided hingedly in a straight line or in a parallel direction, not only a simple construction is obtained, but also the advantage that the propeller arm does not move in axial sense, so that the supporting spherical bearing and the point of the axis of the propeller, forming the top of the conical circuit described by this axis, may be stationary.

In this way it is possible to avoid vibration, produced by a rapid displacement of the propeller, or of the rotating hinge-guiding.

An embodiment is shown by way of an example in the accompanying drawing. The figure of the drawing is a perspective view, partly in section.

In the figure the propeller blade 12 forms a unit with the propeller arm 6. On this propeller arm 6 a spherical bearing 9, 10, 11, 13 is arranged, held by a brust 19 and located by a nut 20 on wire gauge 21 of the propeller arm. The centre 7 of this spherical bearing forms the top of the conical circuit, described by the axis 17 of the propeller. The spherical bearing comprises a ball-shaped inner ring 9, two ball-rows 11, located in a cage 13, and an outer ring 10 which is interiorly ball-shaped and stationary.

On the propeller arm 6 a member 5 is arranged, which by means of a key 8 is prevented from rotating with regard to the propeller arm 6. In axial sense the member 5 may move freely along the propeller arm 6. In the axis 15, which crosses perpendicularly the axis 17 of the propeller, the member 5 is provided with two cylindrical taps 4, forming a unit with the member 5. These taps 4 are guided in bearings 3 of a bow 2. This bow 2 is rigidly connected to the shaft 1 which is rotatably supported in the bearing 18.

The axis 14 of the shaft 1 crosses perpendicularly the axis 15 of the bearings 3 and thus of the taps 4. In this way the member 5 is in radial sense hingedly slidably supported by the bow 2.

The device functions as follows:

When rotating the bow 2 for ¼ revolution the axis 17 comes in an upwardly inclined position. This position and that of the drawing outline the conical circuit as described by the axis 17. By displacing the bearing 18 or the spherical bearing 10 until the axes 17 and 14 coincide, the propeller blade 12 only rotates around the axis 17 because the point of oscillation, being the centre 7, is then brought into the axis 14, a conical circuit is not described and no thrust will be given. Displacement of the bearings 18 and 10 in such a way that the centre 7 comes below the axis 14, makes the axis 17 describing a conical circuit which, contrary to the circuit, the bearings 18 and 10 being in the first mentioned position, points downwardly, and a thrust will be given in an opposite direction.

In this way, by displacing the centre 7 with regard to the axis 14, the resultant thrust of the propeller blade 12 may be given in any desired direction and at the same time may be varied from a positive to a negative maximum or caused to be nought (centre 7 in axis 14). Said displacing may take place parallelly by mutually displacing of the bearings 18 and 10 or by altering the direction of the axis 14, moving the same around a certain point of the said axis. In this latter case preferably that position is accepted as nought-position, in which the axes 14 and 17 coincide, regarding a symmetrical charge of the spherical bearing 10. The driving may take place on one or more of the moving parts.

It will be clear that many constructive variations are possible. Any construction with the propeller arm rigidly connected to a straight or parallel hinge-guiding may be changed according to my invention. The bow 2 for instance may be wheel-shaped, guiding the taps 4 in the bearings 3 or the member 5 on the propeller arm 6 may be obtained in various ways. Fin-propellers provided with two blades (perpendicularly to each other) may be driven in this way if the composing parts are made in a suitable way, the spherical bearing 10 may be replaced by one of the many known constructions, amongst which also those in which the propeller arm is supported oscillatory or hingedly in a rotating tube. The ball cage 13 of the spherical bearing according to the drawing may completely fill up the space between the two rings 19 and 10 in order to obtain a tight construction, in which case the balls 11 may be removed if the outer ring 10 is made adjustable so that it may be decreased in radial sense. The position of the propeller blade 12 with regard to the member 5 may be chosen at will, the propeller arm 6 may be lengthened at the right side of the bearing 10 before carrying the propeller blade 12, in which case the member 5 may be arranged on the propeller arm 6 between the bearing 10 and the propeller blade 12, to which purpose the shaft 1, must be hollow to pass the propeller arm 6; it is not necessary to make the propeller arm 6 and the propeller blade 12 out of one piece, they may be manufactured separately and then connected to each other.

I claim:

1. In a fin propeller the combination of a shaft, a bearing to suspend the said shaft rotatably, a propeller blade, a spherical bearing to suspend said propeller blade in a universally rotatable manner, said spherical bearing being displaced with regard to the axis of the said shaft, two coupling members to couple the said blade to the said shaft, said coupling members being mutually coupled to slide hingedly along each other in a sense perpendicular to the axis of the said shaft, one of the said members being fixed to the said shaft, the other being slidably connected to the said blade.

2. A fin propeller comprising a rotary shaft, a forked member carried by one end of the shaft, bearing elements carried on the prongs of the fork, a member having trunnions slidably and rockably positioned in the bearing elements carried by the fork, said member having a bore extending centrally therethrough transversely to the axis of the trunnions, a propeller shaft, a propeller blade fixed thereto, a ball positioned on the propeller shaft adjacent the blade, a socket surrounding the ball and serving as a universal mounting therefor, said socket being positioned out of alignment with the axis of the rotary shaft.

In testimony whereof I affix my signature.
WIGGER MEINDERSMA.